US010802572B2

(12) United States Patent
Dayal et al.

(10) Patent No.: US 10,802,572 B2
(45) Date of Patent: Oct. 13, 2020

(54) SYSTEM AND METHOD OF DETERMINING WHETHER AN ELECTRONIC DEVICE IS IN CONTACT WITH A HUMAN BODY

(71) Applicant: STMicroelectronics, Inc., Coppell, TX (US)

(72) Inventors: Sankalp Dayal, Santa Clara, CA (US); Mahesh Chowdhary, San Jose, CA (US); Mahaveer Jain, Santa Clara, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 104 days.

(21) Appl. No.: 15/423,318

(22) Filed: Feb. 2, 2017

(65) Prior Publication Data

US 2018/0217660 A1 Aug. 2, 2018

(51) Int. Cl.
| | | |
|---|---|---|
| *G06F 1/3206* | (2019.01) | |
| *G06F 1/3296* | (2019.01) | |
| *G06F 1/20* | (2006.01) | |
| *G06N 20/00* | (2019.01) | |
| *G06F 1/16* | (2006.01) | |
| *G06F 1/3231* | (2019.01) | |

(52) U.S. Cl.
CPC .......... *G06F 1/3296* (2013.01); *G06F 1/1692* (2013.01); *G06F 1/206* (2013.01); *G06F 1/3206* (2013.01); *G06F 1/3231* (2013.01); *G06N 20/00* (2019.01); *Y02D 10/173* (2018.01)

(58) Field of Classification Search
None
See application file for complete search history.

(56) References Cited

U.S. PATENT DOCUMENTS

| | | | | | |
|---|---|---|---|---|---|
| 4,704,696 | A | * | 11/1987 | Reimer | .................. G10L 15/00 704/231 |
| 4,973,899 | A | * | 11/1990 | Jones | .................. G01R 15/246 250/225 |
| 2009/0157206 | A1 | * | 6/2009 | Weinberg | ................ G06F 3/017 700/94 |
| 2009/0265671 | A1 | | 10/2009 | Sachs et al. | |
| 2011/0012840 | A1 | * | 1/2011 | Hotelling | ................ G06F 3/044 345/173 |
| 2011/0141006 | A1 | * | 6/2011 | Rabu | ...................... G01C 21/20 345/156 |
| 2011/0157069 | A1 | * | 6/2011 | Zhuang | ................... G06F 3/044 345/174 |
| 2011/0267026 | A1 | * | 11/2011 | Locker | .................. G06F 1/3203 323/318 |
| 2012/0016641 | A1 | | 1/2012 | Raffa et al. | |

(Continued)

FOREIGN PATENT DOCUMENTS

| | | |
|---|---|---|
| CN | 102246125 A | 11/2011 |
| CN | 208367638 U | 1/2019 |

*Primary Examiner* — Paul Yen
(74) *Attorney, Agent, or Firm* — Slater Matsil, LLP

(57) ABSTRACT

A system may include a motion sensor configured to generate a motion signal in response to a movement of an electronic device, and at least one feature detection circuit configured to determine at least one metric based on the motion signal. The system may further include a classifying circuit configured to determine whether the electronic device is in contact with a human body based on the at least one metric.

20 Claims, 11 Drawing Sheets

(8 of 11 Drawing Sheet(s) Filed in Color)

(56) References Cited

U.S. PATENT DOCUMENTS

| | | |
|---|---|---|
| 2014/0365803 A1 | 12/2014 | Pham et al. |
| 2015/0331462 A1* | 11/2015 | Atkinson ................ G06F 3/044 713/100 |
| 2018/0217660 A1 | 8/2018 | Dayal et al. |

* cited by examiner

… (1)

SYSTEM AND METHOD OF DETERMINING WHETHER AN ELECTRONIC DEVICE IS IN CONTACT WITH A HUMAN BODY

TECHNICAL FIELD

The present disclosure relates generally to electronic devices, and, in particular embodiments, to a system and method of determining whether an electronic device is in contact with a human body.

BACKGROUND

As electronic devices become more ubiquitous and as individuals become more mobile, there is an increasing need to provide computing capabilities and information on the go. Such a need can be met, at least in part, by laptop computers and wearable electronics.

One aspect that users often encounter with the use of laptop computers is overheating of the base of the laptop computer. Power supply components of laptop computers may be located on the bottom surface of the keyboard portion of the laptop computer. During long periods of use or during intense use (e.g. during gaming), the base of the laptop computer can overheat, burn, or cause discomfort to the user if the laptop computer is resting on the user's lap. While elevated temperatures generally do not damage electronics and circuitry of the laptop computer, it can cause harm to human skin.

A new area for consumer electronic devices that provides individuals with computing capabilities and information on the go is wearable electronics. Examples of wearable electronics include the smart watch and wireless (e.g. Bluetooth) headphones. Additionally, individuals sometimes wear their cell phones on their person, such as by attaching their cell phone to their body using a resilient sleeve (e.g. an arm or fitness band) during various activities (e.g. while exercising). There is a widely felt need in the wearable electronics industry for a way to power the devices so that they can be used for longer periods of time.

In either laptop computers or wearable electronics, the electronic device may be in contact (e.g. direct or indirect contact) with human skin. As such, it may be desirable to provide a system and method of determining whether the electronic device is in contact with a human body, thereby allowing the electronic device to adapt its behavior or operation accordingly. As an illustration, in response to a determination that a laptop computer is in contact with a human body, the laptop computer may adapt its behavior or operation to avoid elevated temperatures so that harm to human skin is prevented. As another illustration, in response to a determination that a wearable electronic device is not in contact with a human body, the wearable electronic device may be placed in a low-power mode in an effort to reduce power consumption and extend battery life.

SUMMARY

A system may include a motion sensor configured to generate a motion signal in response to a movement of an electronic device, and at least one feature detection circuit configured to determine at least one metric based on the motion signal. The system may further include a classifying circuit configured to determine whether the electronic device is in contact with a human body based on the at least one metric.

A system may include an accelerometer configured to generate an output signal in response to a vibration or orientation of an electronic device. The system may further include a plurality of feature detection circuits having inputs coupled to an output of the accelerometer, the plurality of feature detection circuits being configured to determine a plurality of metrics indicative of a plurality of characteristics of the output signal. The system may additionally include a classifying circuit configured to determine whether the electronic device is in contact with a human body based on the plurality of metrics, and a controller configured to adapt an operation of the electronic device based on whether the electronic device is in contact with the human body.

A method may include generating a motion signal in response to a movement of an electronic device; determining at least one characteristic of the motion signal; generating at least one metric indicative of the at least one characteristic of the motion signal; and determining whether the electronic device is in contact with a human body based on the at least one metric.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Figure 1:
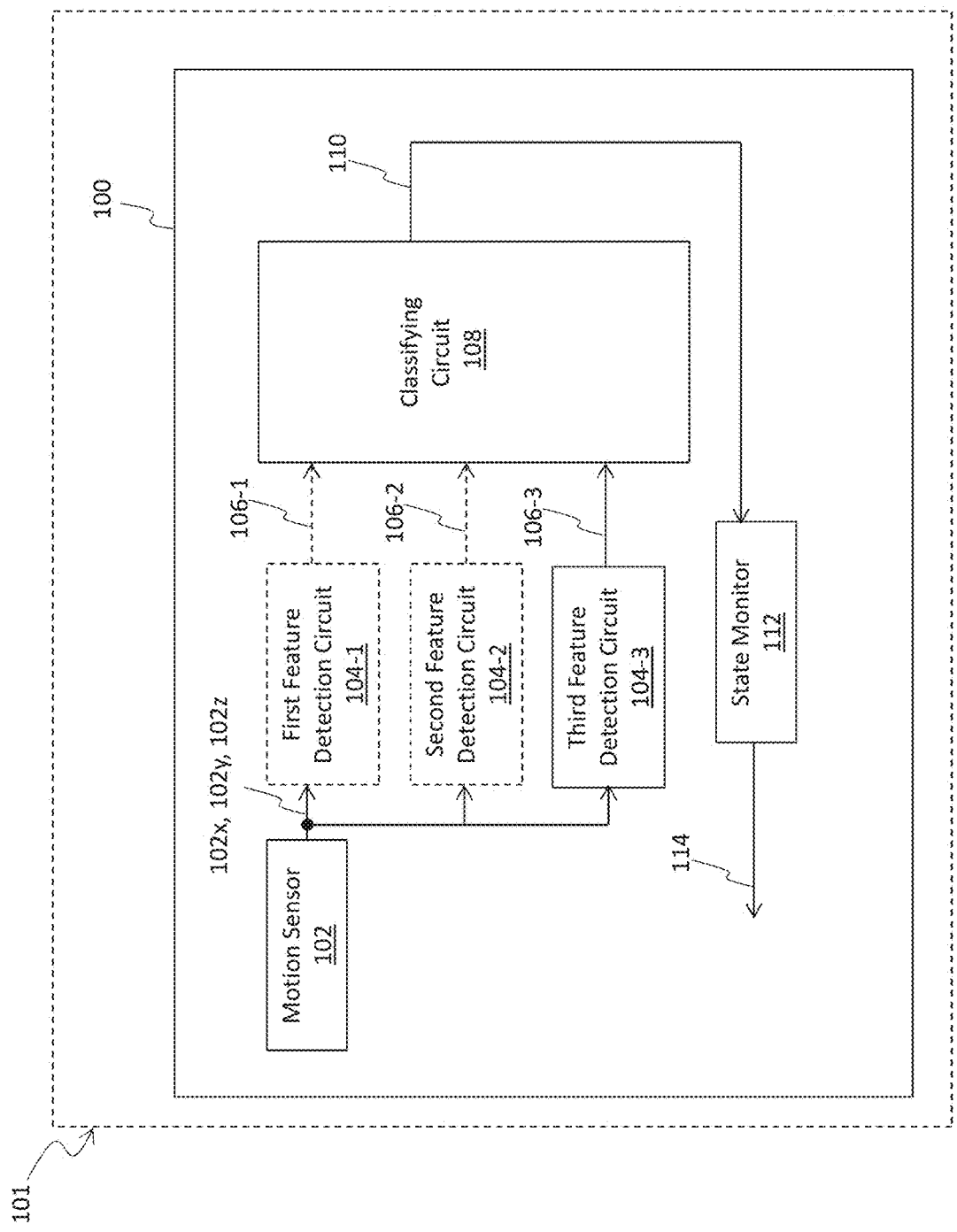
FIG. 1 shows a block diagram of an electronic device including a detection system, in accordance with an embodiment.

FIG. 1 shows a block diagram of an electronic device 101 including a detection system 100, in accordance with an embodiment. The detection system 100 may be within, attached, or coupled to the electronic device 101. The detection system 100 may be used to determine whether the electronic device 101 is in contact with the body of a human user. In response to a determination that the electronic device 101 is in contact with the body of a human user, a state monitor 112 (e.g. a controller of the detection system 100 or the electronic device 101) may adapt the behavior or operation of the electronic device 101 so that elevated temperatures in the electronic device 101 are prevented or substantially reduced. In so doing, harm to human skin may be prevented or substantially reduced. Alternatively, or additionally, in response to a determination that the electronic device 101 is not in contact with the body of a human user, the state monitor 112 may be placed in a low-power mode in an effort to reduce power consumption and extend battery life.

The electronic device 101 may be a laptop computer or a wearable electronic device (e.g. a smart watch, mobile phone, wireless headphones, or the like). The detection system 100 includes a motion sensor 102. The motion sensor 102 may be an accelerometer or a device configured to sense vibration or acceleration of the electronic device 101. For example, the electronic device 101 having the motion sensor 102 may be a laptop computer having an accelerometer coupled or attached to a base of the laptop computer. As another example, the electronic device 101 having the motion sensor 102 may be a cell phone having an accelerometer included within the cell phone. In examples where the motion sensor 102 is an accelerometer, the detection system 100 may be an accelerometer-based detection system 100. The motion sensor 102 may generate time series data, which is depicted in FIG. 1 as sensor data 102$x$, 102$y$, 102$z$.

Figure 2:
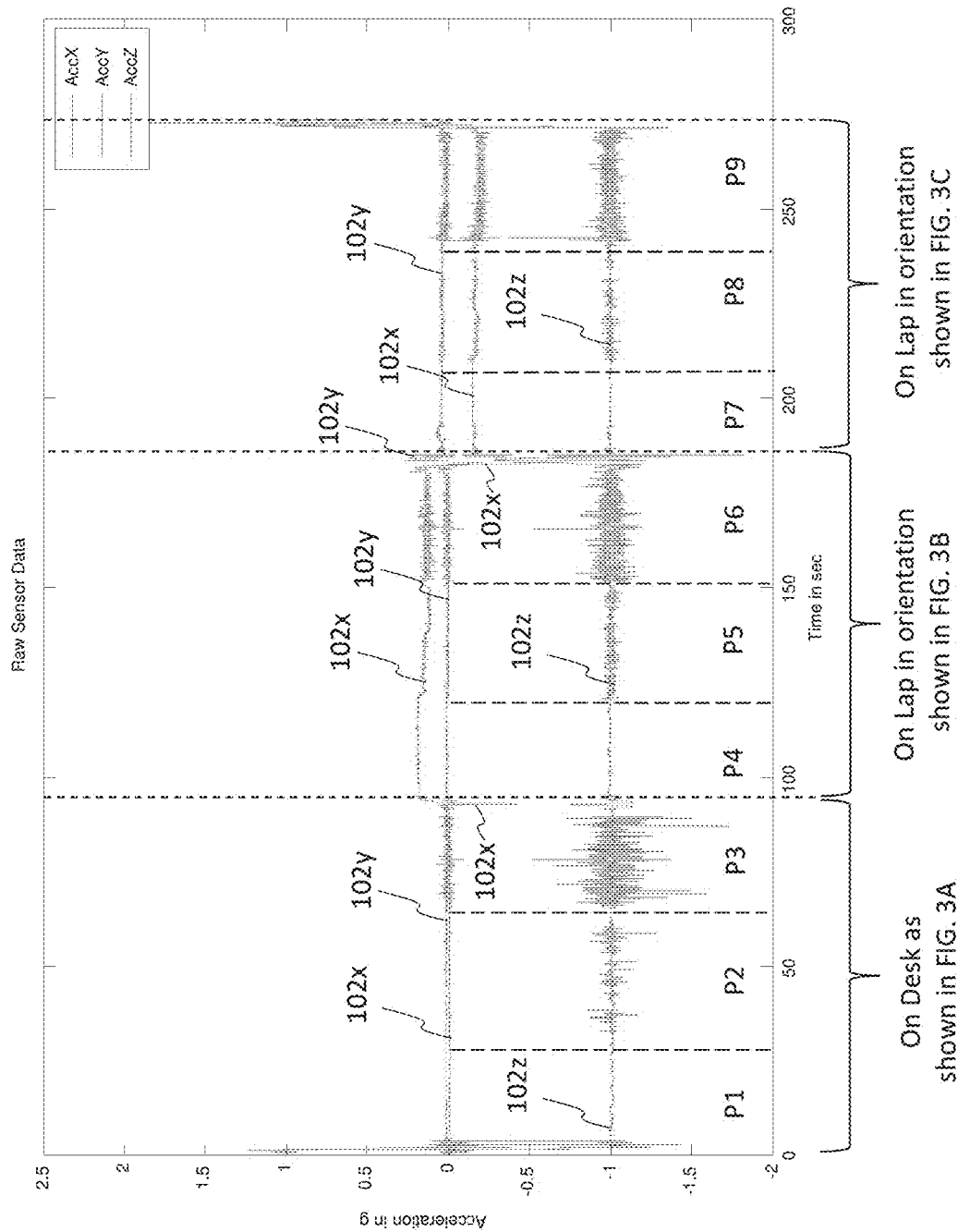
FIG. 2 shows sensor data generated by a motion sensor, in accordance with an embodiment.

FIG. 2 shows sensor data 102$x$, 102$y$, 102$z$ generated by the motion sensor 102, in accordance with an embodiment. In the example shown in FIG. 2, the sensor data 102$x$, 102$y$, 102$z$ may be a time series, where the vertical axis denotes acceleration (measured in units of gravitation force, g, where 1 g=9.81 m/s$^2$) and where the horizontal axis denotes time (measured in seconds). The motion sensor 102 may be configured to sense vibration or acceleration of the electronic device 101 in each axis of motion. For example, the motion sensor 102 may generate sensor data 102$x$, 102$y$, 102$z$ that is indicative of vibration or acceleration of the electronic device 101 in the lateral axis (e.g. referred to as the "x axis"), longitudinal axis (e.g. referred to as the "y axis"), and vertical or normal axis (e.g. referred to as the "z axis"), respectively.

The sensor data 102$x$, 102$y$, 102$z$ may be time series data having a plurality of samples. In other words, the sensor data 102$x$, 102$y$, 102$z$ may be generated by sampling an analog signal sensed by the motion sensor 102. In such embodiments, the motion sensor 102 may include a sampling circuit therein. The sampling circuit may be implemented using one or more sampling circuits known in the art (e.g. a sample-and-hold circuit). In the example shown in FIG. 2, the sensor data 102$x$, 102$y$, 102$z$ is obtained by sampling the analog signal sensed by the motion sensor 102 at a sampling frequency of 50 Hz with a full scale range of ±2 g. The sampling frequency may depend, at least in part, on a characteristic vibration of a human body, which, as described below in respect of FIGS. 4 and 5A to 5E, is between about 5 Hz and about 15 Hz. As such, to fulfill the Nyquist sampling theorem, the rate at which the analog signal of the motion sensor 102 is sampled is greater than or equal to about 30 Hz.

The sensor data 102$x$, 102$y$, 102$z$ generated by the motion sensor 102 may depend, at least in part, on a placement of the electronic device 101, an orientation (e.g. tilt) of the electronic device 101, and the activity performed on or using the electronic device 101. As an illustration, with respect to the placement of the electronic device 101, the electronic device 101 may be placed on a part of the human body (e.g. a lap) or on an inanimate object (e.g. a desk). The sensor data 102$x$, 102$y$, 102$z$ generated when the electronic device 101 is placed on a part of the human body may be different from the sensor data 102$x$, 102$y$, 102$z$ generated when the electronic device 101 is placed on an inanimate object. As a further illustration, with respect to the orientation of the electronic device 101, the electronic device 101 may be flat (e.g. when placed on a flat desk) or inclined with respect to a horizontal plane (e.g. when placed on a human lap). The sensor data 102$x$, 102$y$, 102$z$ generated when the electronic device 101 is flat may be different from the sensor data 102$x$, 102$y$, 102$z$ generated when the electronic device 101 is inclined with respect to a horizontal plane. As an additional illustration, with respect to the activity performed on or using the electronic device 101, the electronic device 101 may be used for passive activity, normal typing, or intense typing. The sensor data 102$x$, 102$y$, 102$z$ generated when the electronic device 101 is used for passive activity may be different from the sensor data 102$x$, 102$y$, 102$z$ generated when the electronic device 101 is used for normal or intense typing. Since the placement, orientation, and activity performed on or using the electronic device 101 may affect the sensor data 102$x$, 102$y$, 102$z$, it follows that each of these features may be determined or extracted from the sensor data 102$x$, 102$y$, 102$z$ and used, either individually or in combination, to determine whether the electronic device 101 is in contact with the body of a human user.

Figure 3A:
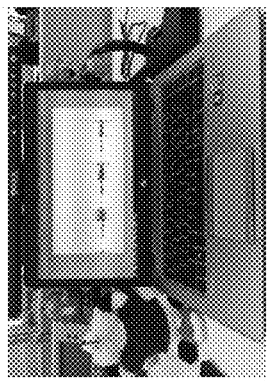
FIGS. 3A to 3C show various placements and orientations of an electronic device, in accordance with an embodiment.
Figure 3B:
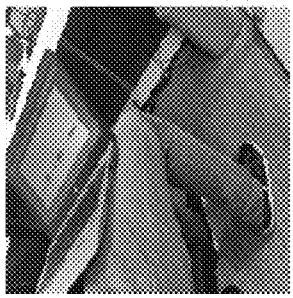
Figure 3C:
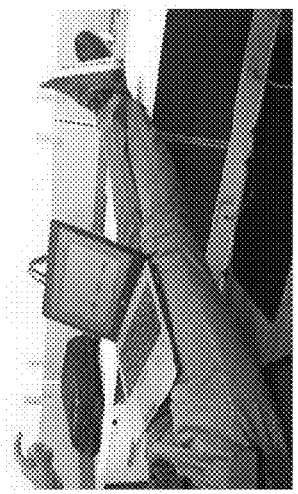

FIGS. 3A to 3C show various placements and orientations of the electronic device 101 in an embodiment where the electronic device 101 is a laptop computer. The electronic device 101 may be placed on a flat desk (e.g. as in FIG. 3A), on a human lap in a first orientation (e.g. as in FIG. 3B), or on a human lap in a second orientation (e.g. as in FIG. 3C). The sensor data 102$x$, 102$y$, 102$z$ shown in FIG. 2 may be generated by placing the electronic device 101 in the various orientations depicted in FIGS. 3A to 3C. For example, the sensor data 102$x$, 102$y$, 102$z$ during time periods P1, P2, and P3 in FIG. 2 may be generated when the electronic device 101 is placed on a flat desk (e.g. as in FIG. 3A). The sensor data 102$x$, 102$y$, 102$z$ during time periods P4, P5, and P6 in FIG. 2 may be generated when the electronic device 101 is placed on a human lap in a first orientation (e.g. as in FIG. 3B). The sensor data 102$x$, 102$y$, 102$z$ during time periods P7, P8, and P9 in FIG. 2 may be generated when the electronic device 101 is placed on a human lap in a second orientation (e.g. as in FIG. 3C).

For a given placement, three different activities may be performed on or using the electronic device 101. For example, in time periods P1, P4, and P7 shown in FIG. 2, no typing may be performed on the electronic device 101, and the electronic device 101 may be used for passive activity such as watching a video, listening to audio, reading, or web browsing. However, in time periods P2, P5, and P8 shown in FIG. 2, normal typing (e.g. associated with replying to emails, coding, or chatting) may be performed on or using the electronic device 101. Furthermore, in time periods P3, P6, and P9 shown in FIG. 2, heavy or intense typing (e.g. associated with gaming) may be performed on or using the electronic device 101.

As described above, the activity performed on or using the electronic device 101 may affect the sensor data 102x, 102y, 102z generated by the motion sensor 102, and this is observed in the sensor data 102x, 102y, 102z shown in FIG. 2. For example, when the electronic device 101 is on a flat desk (e.g. during time periods P1, P2, and P3 shown in FIG. 2), less vibrations are observed in the sensor data 102x, 102y, 102z when the electronic device 101 is used for passive activity (e.g. in time period P1) than when typing is performed on or using the electronic device 101 (e.g. in time periods P2 and P3). Additionally, since more intense typing is performed during time period P3, vibrations that occur during time period P3 have greater amplitude than vibrations that occur during time period P2. Even further, since typing has a significant vector component in the vertical direction (e.g. the z axis), a significant amount of the vibrations observed in the sensor data 102x, 102y, 102z occurs in the normal axis sensor data 102z. The significant vector component in the vertical direction also manifests itself in the normal axis sensor data 102z being centered about −1 g during time periods P1, P2, and P3 (as opposed to the lateral axis sensor data 102x and the longitudinal axis sensor data 102y being centered about 0 g during time periods P1, P2, and P3).

A similar trend may be observed when the electronic device 101 is on a human lap in a first orientation (e.g. during time periods P4, P5, and P6 shown in FIG. 2). For example, less vibrations are observed in the sensor data 102x, 102y, 102z when the electronic device 101 is used for passive activity (e.g. in time period P4) than when typing is performed on or using the electronic device 101 (e.g. in time periods P5 and P6). Additionally, since more intense typing is performed during time period P6, vibrations that occur during time period P6 have greater amplitude than vibrations that occur during time period P5. Similarly, a significant amount of the vibrations observed in the sensor data 102x, 102y, 102z occurs in the normal axis sensor data 102z since typing has a significant vector component in the vertical direction (e.g. the z axis). The significant vector component in the vertical direction also manifests itself in the normal axis sensor data 102z being centered about −1 g during time periods P4, P5, and P6 (as opposed to the lateral axis sensor data 102x being centered about approximately 0.2 g and the longitudinal axis sensor data 102y being centered about 0 g during time periods P4, P5, and P6).

The above-described trend may also be observed when the electronic device 101 is on a human lap in a second orientation (e.g. during time periods P7, P8, and P9 shown in FIG. 2). For example, less vibrations are observed in the sensor data 102x, 102y, 102z when the electronic device 101 is used for passive activity (e.g. in time period P7) than when typing is performed on or using the electronic device 101 (e.g. in time periods P8 and P9). Additionally, since more intense typing is performed during time period P9, vibrations that occur during time period P9 have greater amplitude than vibrations that occur during time period P8. Similarly, a significant amount of the vibrations observed in the sensor data 102x, 102y, 102z occurs in the normal axis sensor data 102z since typing has a significant vector component in the vertical direction (e.g. the z axis). The significant vector component in the vertical direction also manifests itself in the normal axis sensor data 102z being centered about −1 g during time periods P7, P8, and P9 (as opposed to the lateral axis sensor data 102x being centered about approximately −0.2 g and the longitudinal axis sensor data 102y being centered about 0 g during time periods P7, P8, and P9).

As described above, the orientation (e.g. tilt) of the electronic device 101 may affect the sensor data 102x, 102y, 102z generated by the motion sensor 102, and this is also observed in the sensor data 102x, 102y, 102z shown in FIG. 2. For example, during time periods P1, P2, and P3 when the electronic device 101 is on a flat desk, the angle subtended between the base of the laptop computer and the horizontal plane is substantially zero. The orientation or tilt of the electronic device 101 affects the sensor data 102x, 102y, 102z. As observed in FIG. 2, the lateral axis sensor data 102x and the longitudinal axis sensor data 102y are centered about 0 g during time periods P1, P2, and P3 since the angle subtended between the base of the laptop computer and the horizontal plane is substantially zero.

On the other hand, during time periods P4, P5, and P6 when the electronic device 101 is on a human lap in the first orientation, the angle subtended between the base of the laptop computer and the horizontal plane is not substantially zero. This is also the case during time periods P7, P8, and P9 when the electronic device 101 is on a human lap in the second orientation. The orientation or tilt of the electronic device 101 affects the sensor data 102x, 102y, 102z. As observed in FIG. 2, the lateral axis sensor data 102x is offset from 0 g, while the longitudinal axis sensor data 102y is centered about 0 g during time periods P4 to P9 since the angle subtended between the base of the laptop computer and the horizontal plane is not substantially zero.

As shown in FIG. 2, the offset of the lateral axis sensor data 102x from 0 g is positive during time periods P4, P5, and P6, but negative during time periods P7, P8, and P9. This is, again, due to the different orientations of the laptop computer in the time periods P4, P5, and P6 and the time periods P7, P8 and P9. For example, during the time periods P4, P5, and P6, the laptop computer is tilted downwards (e.g. as shown in FIG. 3B), thereby causing the positive offset of the lateral axis sensor data 102x from 0 g during time periods P4, P5, and P6. On the other hand, during the time periods P7, P8, and P9, the laptop computer is tilted upwards (e.g. as shown in FIG. 3C), thereby causing the negative offset of the lateral axis sensor data 102x from 0 g during time periods P7, P8, and P9.

Based on the description above, it follows that the amount of activity performed on or using the electronic device 101 may be determined from the sensor data 102x, 102y, 102z, and such a determination may be used to determine whether the electronic device 101 is in contact with the body of a human user. Additionally, it follows that the orientation (or tilt) of the electronic device 101 may be determined from the sensor data 102x, 102y, 102z, and such orientation or tilt may be used to determine whether the electronic device 101 is in contact with the body of a human user.

Consequently, referring back to FIG. 1, the detection system 100 may include a first feature detection circuit 104-1, a second feature detection circuit 104-2, or both. Each of the first feature detection circuit 104-1 and the second detection circuit 104-2 may be configured to receive the sensor data 102x, 102y, 102z as an input signal. The first feature detection circuit 104-1 may be configured to determine the amount of activity performed on or using the electronic device 101 from the sensor data 102x, 102y, 102z. The second feature detection circuit 104-2 may be configured to determine the orientation of the electronic device 101 from the sensor data 102x, 102y, 102z.

At least a portion of the first feature detection circuit 104-*i* may be included in a processor (e.g. of the electronic device 101). The first feature detection circuit 104-1 may output a first metric 106-1 that is indicative of the amount of activity performed on or using the electronic device 101. In some embodiments, the first metric 106-1 may be, or may be indicative of, the total number of zero crossings that occur in the sensor data 102$x$, 102$y$, 102$z$ in a predetermined time window (e.g. a window having about 100 samples). The number of zero crossings that occur in each of the 3 axes of motion may be computed in a running window of about 100 samples, and the number of zero crossings that occur in each of the 3 axes of motion may be summed (e.g. by the first feature detection circuit 104-1) to produce the first metric 106-1.

A greater number of zero crossings may be indicative of a greater amount of activity performed on or using the electronic device 101, while a smaller number of zero crossings may be indicative of a lesser amount of activity performed on or using the electronic device 101. For example, referring to FIG. 2, the number of zero crossings that occur in the time periods P1, P2, and P3 may be greater than the number of zero crossings that occur in the time periods P4, P5, and P6 or in the time periods P7, P8, and P9. This may be a result of both the lateral axis sensor data 102$x$ and the longitudinal axis sensor data 102$y$ being centered about 0 g during time periods P1, P2, and P3, thereby increasing the total number of zero crossings that occur in the time periods P1, P2, and P3 (e.g. compared to time periods P4, P5, and P6 or time periods P7, P8, and P9). The normal axis sensor data 102$Z$ is centered about −1 g during time periods P1, P2, and P3, and therefore has a minimal contribution to the total number of zero crossings that occur in the time periods P1, P2, and P3 despite its large vibrational amplitudes.

On the other hand, only the longitudinal axis sensor data 102$y$ may be centered about 0 g during time periods P4, P5, and P6. The normal axis sensor data 102$z$ is centered about −1 g during time periods P4, P5, and P6, and therefore has a minimal contribution to the total number of zero crossings that occur in the time periods P4, P5, and P6 despite its large vibrational amplitudes. Furthermore, the lateral axis sensor data 102$x$ is centered about 0.2 g and has small vibrational amplitudes during time periods P4, P5, and P6, and therefore has a minimal contribution to the total number of zero crossings that occur in the time periods P4, P5, and P6.

Similarly, only the longitudinal axis sensor data 102$y$ may be centered about 0 g during time periods P7, P8, and P9. The normal axis sensor data 102$z$ is centered about −1 g during time periods P7, P8, and P9, and therefore has a minimal contribution to the total number of zero crossings that occur in the time periods P7, P8, and P9 despite its large vibrational amplitudes. Furthermore, the lateral axis sensor data 102$x$ is centered about −0.2 g and has small vibrational amplitudes during time periods P7, P8, and P9, and therefore has a minimal contribution to the total number of zero crossings that occur in the time periods P7, P8, and P9.

Consequently, based on the above-description of the total number of zero crossings that occur in the sensor data 102$x$, 102$y$, 102$z$ in a predetermined time window, a smaller number of zero crossings may indicate that the electronic device 101 is in contact with the body of a human user.

As another example of how the total number of zero crossings that occur in the sensor data 102$x$, 102$y$, 102$z$ in a predetermined time window may be used to determine whether the electronic device 101 is in contact with the body of a human user, the sensor data 102$x$, 102$y$, 102$z$ may resemble white noise when the electronic device 101 is in contact with an inanimate object (e.g. a table). White noise may typically be characterized by random fluctuations that occur over a wide range of frequencies and this may result in a higher number of zero crossings in a predetermined time window (e.g. in comparison with sensor data 102$x$, 102$y$, 102$z$ generated when the electronic device 101 is in contact with a human body). On the other hand, when the electronic device 101 is in contact with a human body, the sensor data 102$x$, 102$y$, 102$z$ may contain fluctuations that have frequency components in a predetermined range (e.g. by virtue of contact with a human body, as described below). Consequently, the number of zero crossings may be lower when the electronic device 101 is in contact with a human body (e.g. in comparison with sensor data 102$x$, 102$y$, 102$z$ generated when the electronic device 101 is not in contact with a human body). This leads to a similar result of a smaller number of zero crossings indicating that the electronic device 101 is in contact with the body of a human user.

The amount of activity performed on or using the electronic device 101, by itself, may be insufficient or inaccurate in indicating whether the electronic device 101 is in contact with the body of a human user. For example, the electronic device 101 may be placed on an inclined desk and not be in contact with the body of a human user. As such, using solely the first metric 106-1 (e.g. indicative of the total number of zero crossings that occur in the sensor data 102$x$, 102$y$, 102$z$ in a predetermined window of time) may erroneously lead to a determination that the electronic device 101 is in contact with the body of a human user. Consequently, additional features may need to be determined or extracted from the sensor data 102$x$, 102$y$, 102$z$ in order to accurately determine whether the electronic device 101 is in contact with the body of a human user.

As described above, the orientation or tilt of the electronic device 101 may affect the sensor data 102$x$, 102$y$, 102$z$ generated by the motion sensor 102, and this may be used (e.g. in addition to the first metric 106-1) to determine whether the electronic device 101 is in contact with the body of a human user. As described above, the second feature detection circuit 104-2 may be configured to determine the orientation of the electronic device 101 from the sensor data 102$x$, 102$y$, 102$z$. At least a portion of the second feature detection circuit 104-2 may be included in a processor (e.g. of the electronic device 101). The second feature detection circuit 104-2 may output a second metric 106-2 that is indicative of the orientation of the electronic device 101. The second metric 106-2 may be determined by computing a mean orientation (e.g. mean tilt angle) of the electronic device 101 in a predetermined time window (e.g. a window having about 100 samples).

In some embodiments, the second metric 106-2 may be, or may be indicative of, an angle subtended between the electronic device 101 (e.g. a base or any other plane of the electronic device 101) and a reference plane (e.g. a horizontal plane or leveled ground). A greater angle subtended between the electronic device 101 and a reference plane may indicate that the electronic device 101 is on an inclined plane (e.g. on a part of the body of a human user), while a smaller angle may indicate that the electronic device 101 is on a substantially flat plane (e.g. on a flat desk). The second metric 106-2 may be expressed in terms of roll and pitch. For example, the motion sensor 102 (e.g. accelerometer) may measure the gravitational force exerted on the electronic device 101 in each plane of motion (e.g. vectors AccX, AccY, AccZ), and the angle subtended between the electronic device 101 and a reference plane may be determined from the vectors AccX, AccY, AccZ. Illustratively, roll may be given as a $\tan (AccY/AccZ)$, while pitch may be given by a $\tan (AccY/\sqrt{(AccZ)^2+(AccY)^2})$.

Alternatively, or in addition, the second metric 106-2 may be a rate of change of the angle subtended between the electronic device 101 and a reference plane. When the electronic device 101 is placed on an inanimate object (e.g. a flat or an inclined desk), the angle subtended between the electronic device 101 and a reference plane may not change as frequently as when the electronic device 101 is in contact with the body of a human user.

The orientation of the electronic device 101, by itself, may be insufficient or inaccurate in indicating whether the electronic device 101 is in contact with the body of a human user. For example, the electronic device 101 may be placed on an inclined desk and not be in contact with the body of a human user. Using solely the orientation of the electronic device 101 may erroneously lead to a determination that the electronic device 101 is in contact with the body of a human user. Consequently, additional features may need to be determined or extracted from the sensor data 102$x$, 102$y$, 102$z$ in order to accurately determine whether the electronic device 101 is in contact with the body of a human user. As described above, the placement of the electronic device 101 (e.g. on a part of the human or on an inanimate object) may affect the sensor data 102$x$, 102$y$, 102$z$ generated by the motion sensor 102, and this may be observed in a spectrogram of the sensor data 102$x$, 102$y$, 102$z$ shown in FIG. 2.

Figure 4:
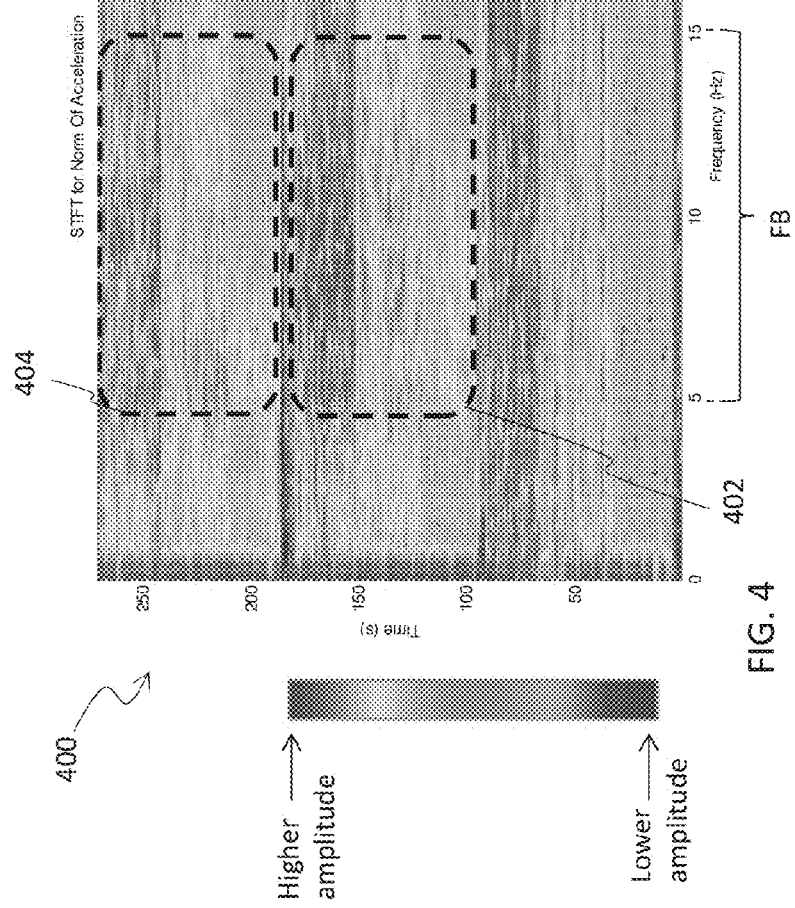
FIG. 4 shows a spectrogram of the sensor data shown in FIG. 2, in accordance with an embodiment.

FIG. 4 shows a spectrogram 400 of the sensor data 102$x$, 102$y$, 102$z$ shown in FIG. 2, in accordance with an embodiment. The spectrogram 400 shows the variation of frequencies with respect to time, and in the spectrogram 400 shown in FIG. 4, the horizontal axis denotes frequency (measured in Hz) and ranges from 0 Hz to about 25 Hz, while the vertical axis denotes time (measured in seconds). The spectrogram 400 is a short-time Fourier transform (STFT) of the norm (or magnitude) of the sensor data 102$x$, 102$y$, 102$z$ shown in FIG. 2, in which a sliding window of about 100 samples is used. The spectrogram 400 in FIG. 4 is shown with a default color map and, as such, the amplitude of a particular frequency at a particular time is represented by the intensity or color of each point in the spectrogram 400. Illustratively, a hotter color (e.g. a more yellow, orange, or red color) indicates a higher amplitude of a particular frequency at a particular time, while a cooler color (e.g. a more cyan or blue color) indicates a lower amplitude of a particular frequency at a particular time.

Human bodies, on average, have a characteristic vibration in the range from about 5 Hz to about 15 Hz (e.g. indicated in FIG. 4 as frequency band FB). As such, when the electronic device 101 is in contact with a human body (e.g. as in time periods P4 to P9 in FIGS. 2 and 4), such characteristic vibration of the human body may be sensed by the motion sensor 102 and may manifest itself in the sensor data 102$x$, 102$y$, 102$z$.

The contribution of the characteristic vibration of the human body to the sensor data 102$x$, 102$y$, 102$z$ may be observed in the spectrogram 400 in the regions of the spectrogram 400 encompassed by the boundaries 402 and 404. In particular, for a given time period in which the electronic device 101 is in contact with the human body, the frequencies in the frequency band FB have greater amplitudes in comparison to frequencies outside the frequency band FB. For example, in time period P4 (e.g. when the electronic device 101 is placed on a human lap in a first orientation and used for passive activity), the frequencies between 5 Hz and about 15 Hz have greater amplitudes in comparison to frequencies outside the frequency band FB. Similarly, in time period P7 (e.g. when the electronic device 101 is placed on a human lap in a second orientation and used for passive activity), the frequencies between 5 Hz and about 15 Hz have greater amplitudes in comparison to frequencies outside the frequency band FB. In comparison, in time period P1 (e.g. when the electronic device 101 is placed on a desk and used for passive activity), the frequencies between 5 Hz and about 15 Hz have amplitudes that are similar to frequencies outside the frequency band FB. As such, during time period P1, there is no additional contribution to frequencies within the frequency band FB, and thus, a low and almost white noise is observed in the spectrogram 400 during time period P1.

There may be sources of vibrations other than from the human body, examples being vibrations generated by typing performed on or using the electronic device 101 or vibrations generated by a fan or a cooling mechanism included in the electronic device 101. Nonetheless, vibrations introduced into the sensor data 102$x$, 102$y$, 102$z$ by a fan or a cooling mechanism tend to be localized in frequency, thereby manifesting as a peak in the frequency response or spectrum of the sensor data 102$x$, 102$y$, 102$z$. Furthermore, vibrations introduced into the sensor data 102$x$, 102$y$, 102$z$ by typing tend to be evenly spread in frequency, thereby manifesting as white noise in the frequency response or spectrum of the sensor data 102$x$, 102$y$, 102$z$. This is also observed in the spectrogram 400 shown in FIG. 4.

In particular, for a given time period in which the electronic device 101 is not in contact with the human body but where typing occurs (e.g. in time periods P2 and P3), all frequencies in the range of 0 Hz and about 25 Hz show increased amplitudes. As such, as mentioned above, typing contributes to an increased noise floor, but such noise is almost white (e.g. uniform across all frequencies between 0 Hz and about 25 Hz). On the other hand, for a given time period in which the electronic device 101 is in contact with the human body but where typing occurs (e.g. in time periods P5, P6, P8, and P9), there is an increase in the amplitude of all frequencies between 0 Hz and about 25 Hz, but there is a concentration of energy in the spectrogram 400 within the frequency band FB (e.g. between about 5 Hz and about 15 Hz). The concentration of energy in the spectrogram 400 within the frequency band FB when the electronic device 101 is in contact with a lap of the human body is also observed when the electronic device 101 is in contact with the hand, head, arm, or chest of the human body. This is shown in the spectrograms illustrated in FIGS. 5A to 5E.

FIGS. 5A to 5E show spectrograms illustrating the frequency content of the sensor data 102$x$, 102$y$, 102$z$ obtained when the electronic device 101 is in contact with various parts of the human body, in accordance with an embodiment. In the spectrograms of FIGS. 5A to 5E, the horizontal axis denotes frequency (measured in Hz) and ranges from 0 Hz to about 25 Hz, while the vertical axis denotes time (measured in seconds). The spectrograms of FIGS. 5A to 5E are short-time Fourier transform (STFT) of the norm (or magnitude) of sensor data 102$x$, 102$y$, 102$z$. The sensor data 102$x$, 102$y$, 102$z$ was collected by initially placing the electronic device 101 having the motion sensor 102 on a particular part of the human body (e.g. indicated in FIGS. 5A to 5E as time period P10), followed by placing the electronic device 101 having the motion sensor 102 on a desk (e.g. indicated in FIGS. 5A to 5E as time period P11). The spectrograms in FIGS. 5A to 5E are shown with a default color map and, as such, the amplitude of a particular frequency at a particular time is represented by the intensity or color of each point in the spectrogram. Illustratively, a hotter color (e.g. a more yellow, orange, or red color) indicates a higher amplitude of a particular frequency at a particular time, while a cooler color (e.g. a more cyan or blue color) indicates a lower amplitude of a particular frequency at a particular time.

Based on the description given above in respect of FIG. 4, it may be expected that there is a concentration of energy in the spectrograms within the frequency band FB (e.g. between about 5 Hz and about 15 Hz) when the electronic device 101 is in contact with a particular part of the human body (e.g. during time period P10). On the other hand, it may also be expected that the spectrogram is uniform across all frequencies between 0 Hz and about 25 Hz when the electronic device 101 is placed on a desk (e.g. during time period P11). Indeed, this is seen in the spectrograms shown in FIGS. 5A to 5E.

Figure 5A:
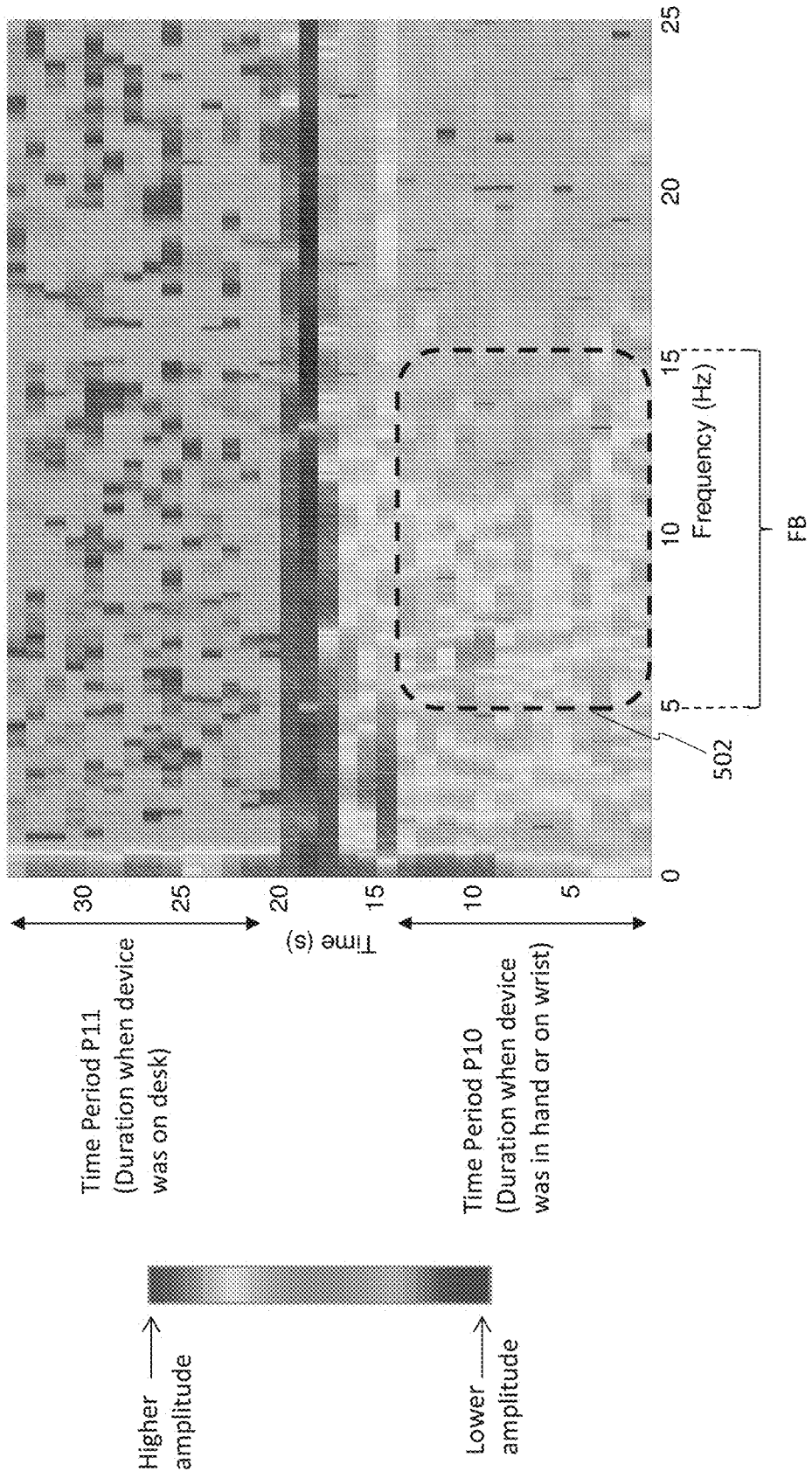
FIGS. 5A to 5E show spectrograms illustrating the frequency content of sensor data obtained when an electronic device is in contact with various parts of the human body, in accordance with an embodiment.

As shown in FIG. 5A, the characteristic vibration of the human body manifests in the spectrogram in the regions of the spectrogram encompassed by the boundary 502. When the electronic device 101 is in contact with a hand or a wrist of the human body (during time period P10), the frequencies between 5 Hz and about 15 Hz have greater amplitudes in comparison to frequencies outside the frequency band FB. Conversely, when the electronic device is in placed on a desk (during time period P11), the frequencies between 5 Hz and about 15 Hz have amplitudes that are similar to frequencies outside the frequency band FB.

Figure 5B:
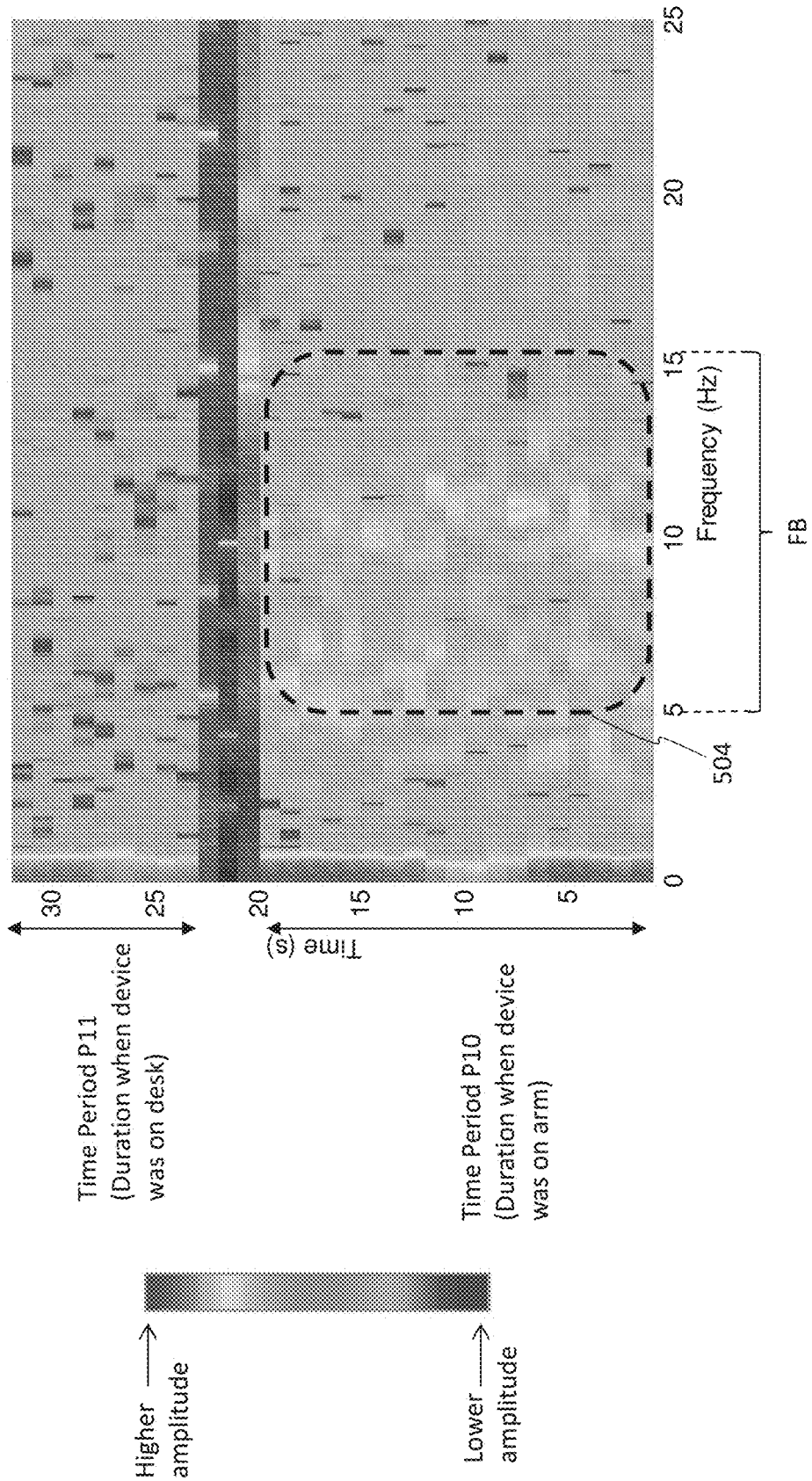

As shown in FIG. 5B, the characteristic vibration of the human body manifests in the spectrogram in the regions of the spectrogram encompassed by the boundary 504. When the electronic device 101 is in contact with an arm of the human body (during time period P10), the frequencies between 5 Hz and about 15 Hz have greater amplitudes in comparison to frequencies outside the frequency band FB. Conversely, when the electronic device is in placed on a desk (during time period P11), the frequencies between 5 Hz and about 15 Hz have amplitudes that are similar to frequencies outside the frequency band FB.

Figure 5C:
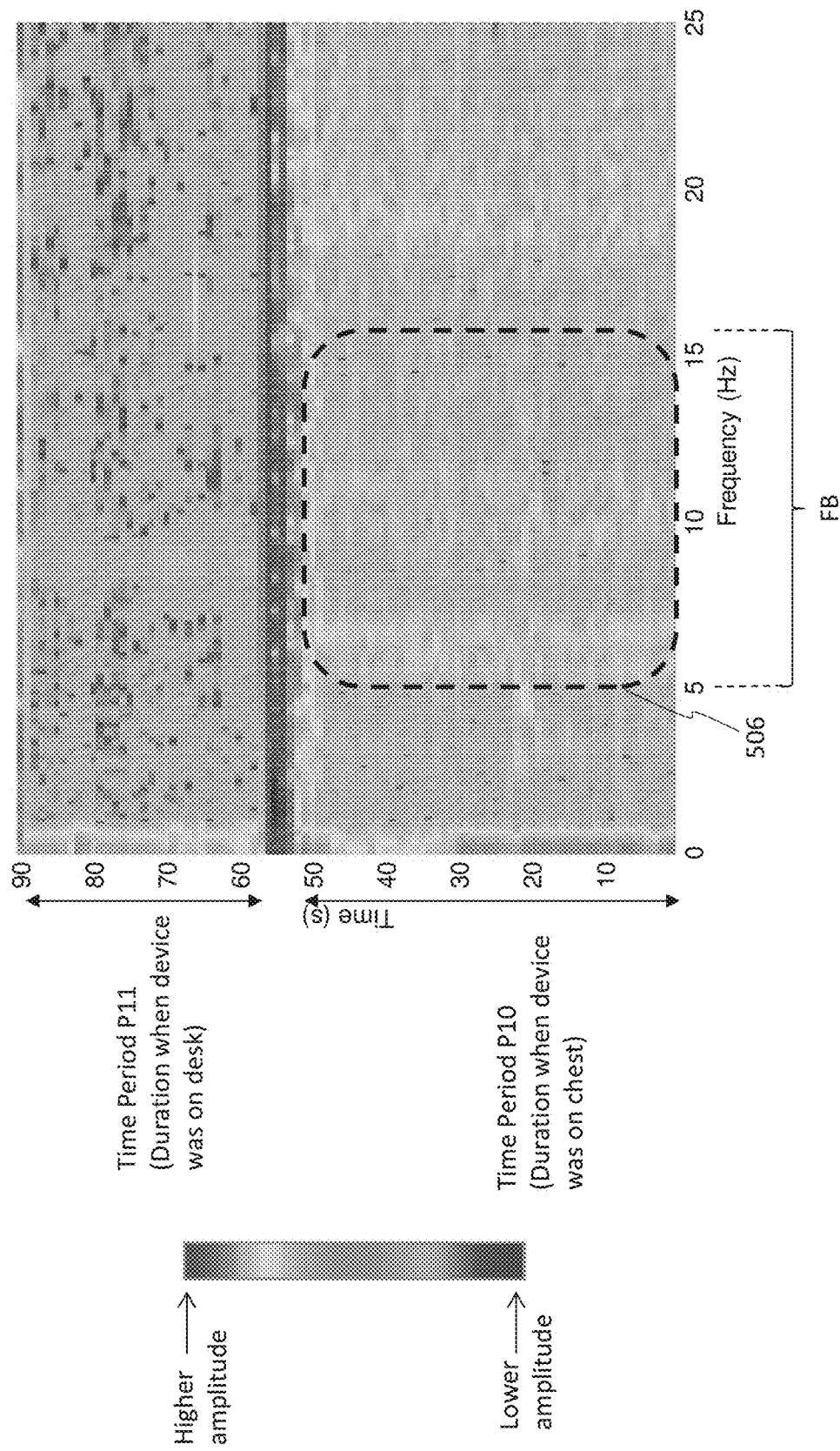

As shown in FIG. 5C, the characteristic vibration of the human body manifests in the spectrogram in the regions of the spectrogram encompassed by the boundary 506. When the electronic device 101 is in contact with the chest of the human body (during time period P10), the frequencies between 5 Hz and about 15 Hz have greater amplitudes in comparison to frequencies outside the frequency band FB. Conversely, when the electronic device is in placed on a desk (during time period P11), the frequencies between 5 Hz and about 15 Hz have amplitudes that are similar to frequencies outside the frequency band FB.

Figure 5D:
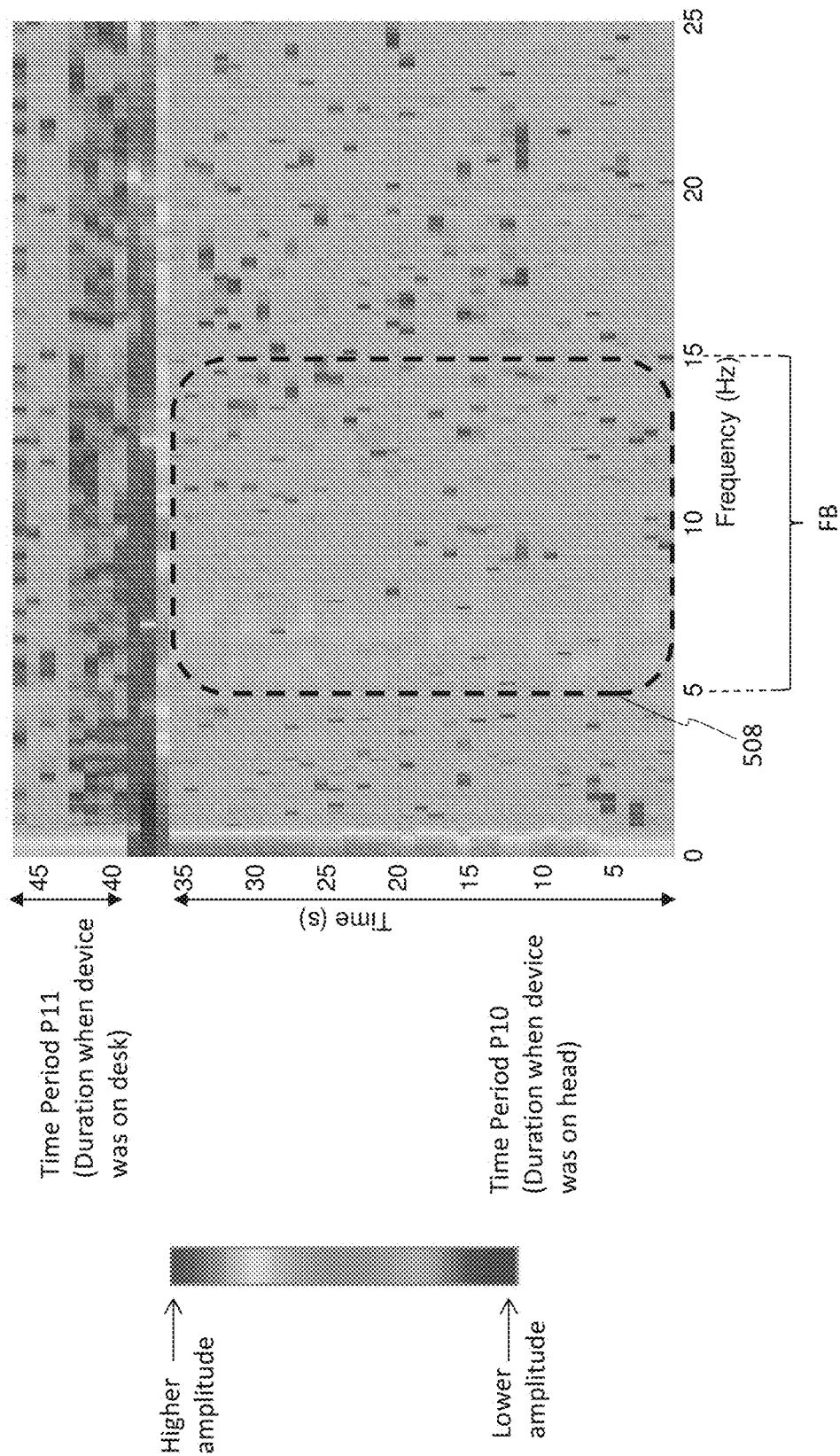

As shown in FIG. 5D, the characteristic vibration of the human body manifests in the spectrogram in the regions of the spectrogram encompassed by the boundary 508. When the electronic device 101 is in contact with the head of the human body (during time period P10), the frequencies between 5 Hz and about 15 Hz have greater amplitudes in comparison to frequencies outside the frequency band FB. Conversely, when the electronic device is in placed on a desk (during time period P11), the frequencies between 5 Hz and about 15 Hz have amplitudes that are similar to frequencies outside the frequency band FB.

Figure 5E:
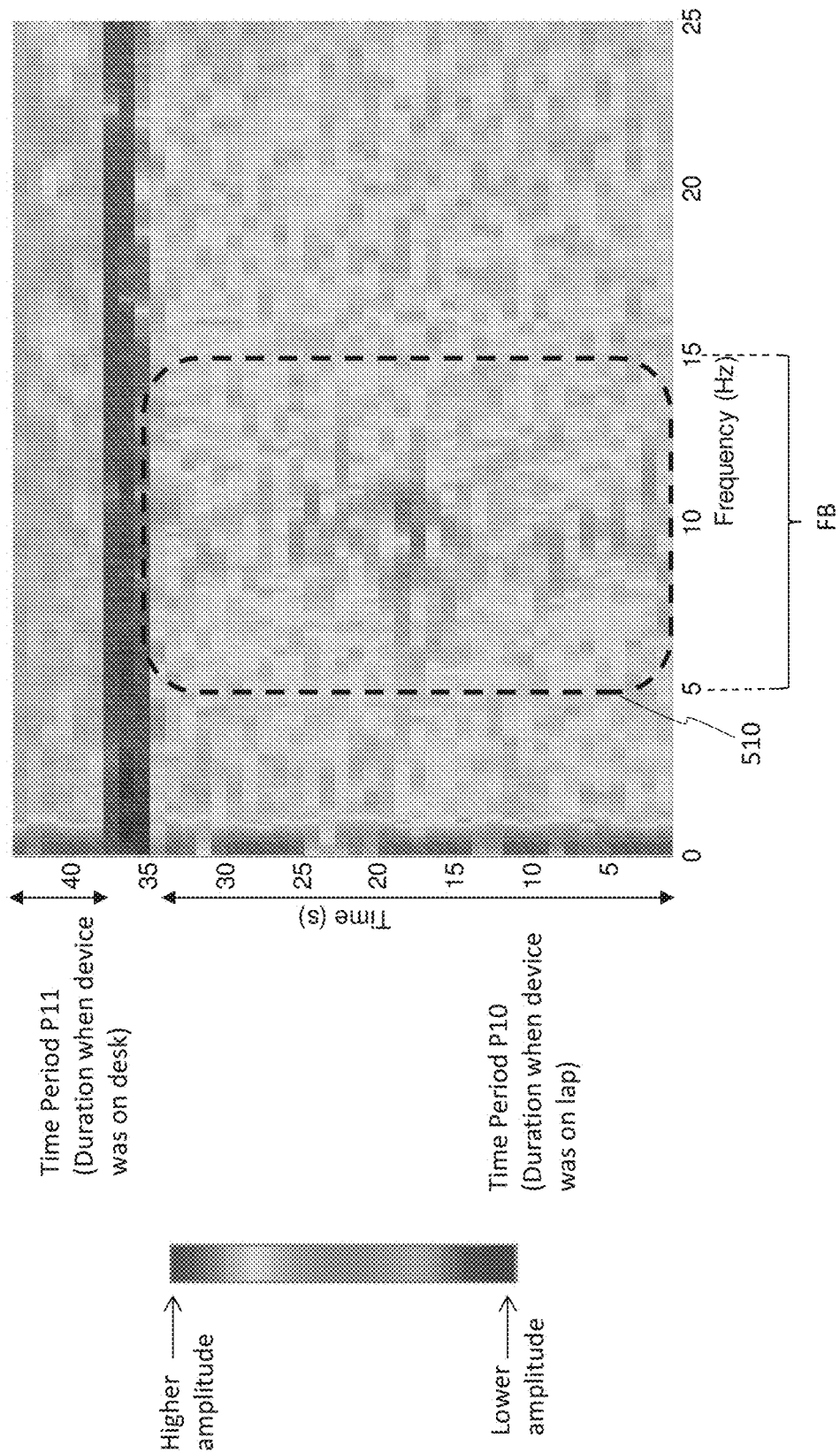

As shown in FIG. 5E, the characteristic vibration of the human body manifests in the spectrogram in the regions of the spectrogram encompassed by the boundary 510. When the electronic device 101 is in contact with the lap of the human body (during time period P10), the frequencies between 5 Hz and about 15 Hz have greater amplitudes in comparison to frequencies outside the frequency band FB. Conversely, when the electronic device is in placed on a desk (during time period P11), the frequencies between 5 Hz and about 15 Hz have amplitudes that are similar to frequencies outside the frequency band FB.

Consequently, based on the description given above in respect of FIGS. 4 and 5A to 5E, spectral features of the sensor data $102x$, $102y$, $102z$ may also be used to determine whether the electronic device 101 is in contact with a human body. As such, referring back to FIG. 1, the detection system 100 may include a third feature detection circuit 104-3 configured to receive the sensor data $102x$, $102y$, $102z$ as an input signal. The third feature detection circuit 104-3 may be configured to determine a spectral feature of the sensor data $102x$, $102y$, $102z$.

At least a portion of the third feature detection circuit 104-3 may be included in a processor (e.g. of the electronic device 101). The third feature detection circuit 104-3 may output a third metric 106-3 that is indicative of the spectral energy present in the frequency band FB (e.g. about 5 Hz to about 15 Hz). In some embodiments, the third metric 106-3 may be, or may be indicative of, at least one of the following: an energy in the frequency band FB; a ratio of the energy in the frequency band FB to the total energy of the sensor data $102x$, $102y$, $102z$; a ratio of the energy in the frequency band FB to the energy outside the frequency band FB; an average of the energy in the frequency band FB; an average of a ratio of the energy in the frequency band FB to the total energy of the sensor data $102x$, $102y$, $102z$; or an average of a ratio of the energy in the frequency band FB to the energy outside the frequency band FB.

Figure 6:
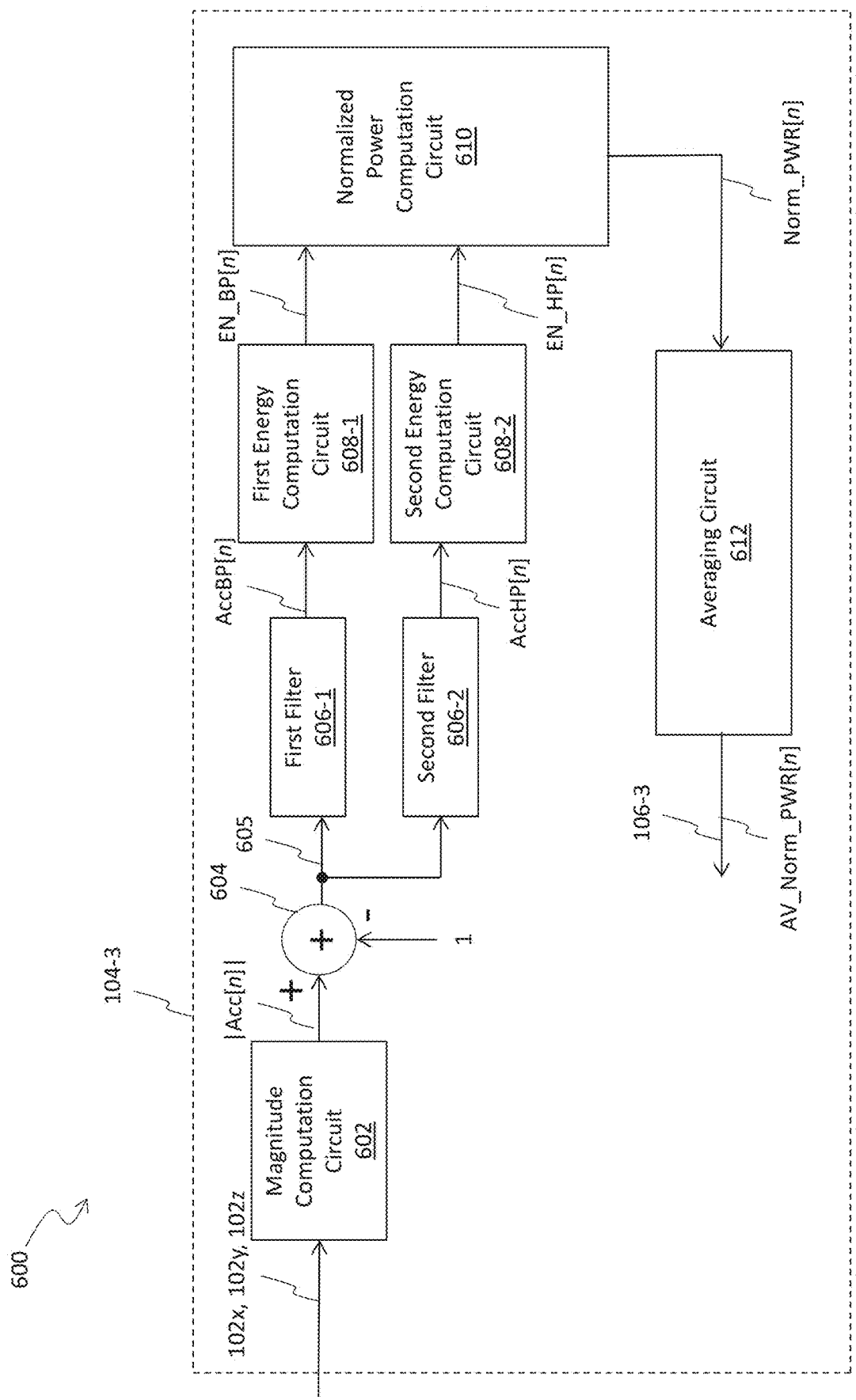
FIG. 6 shows a block diagram illustrating the internal circuitry of a feature detection circuit, in accordance with an embodiment.
Figure 7:
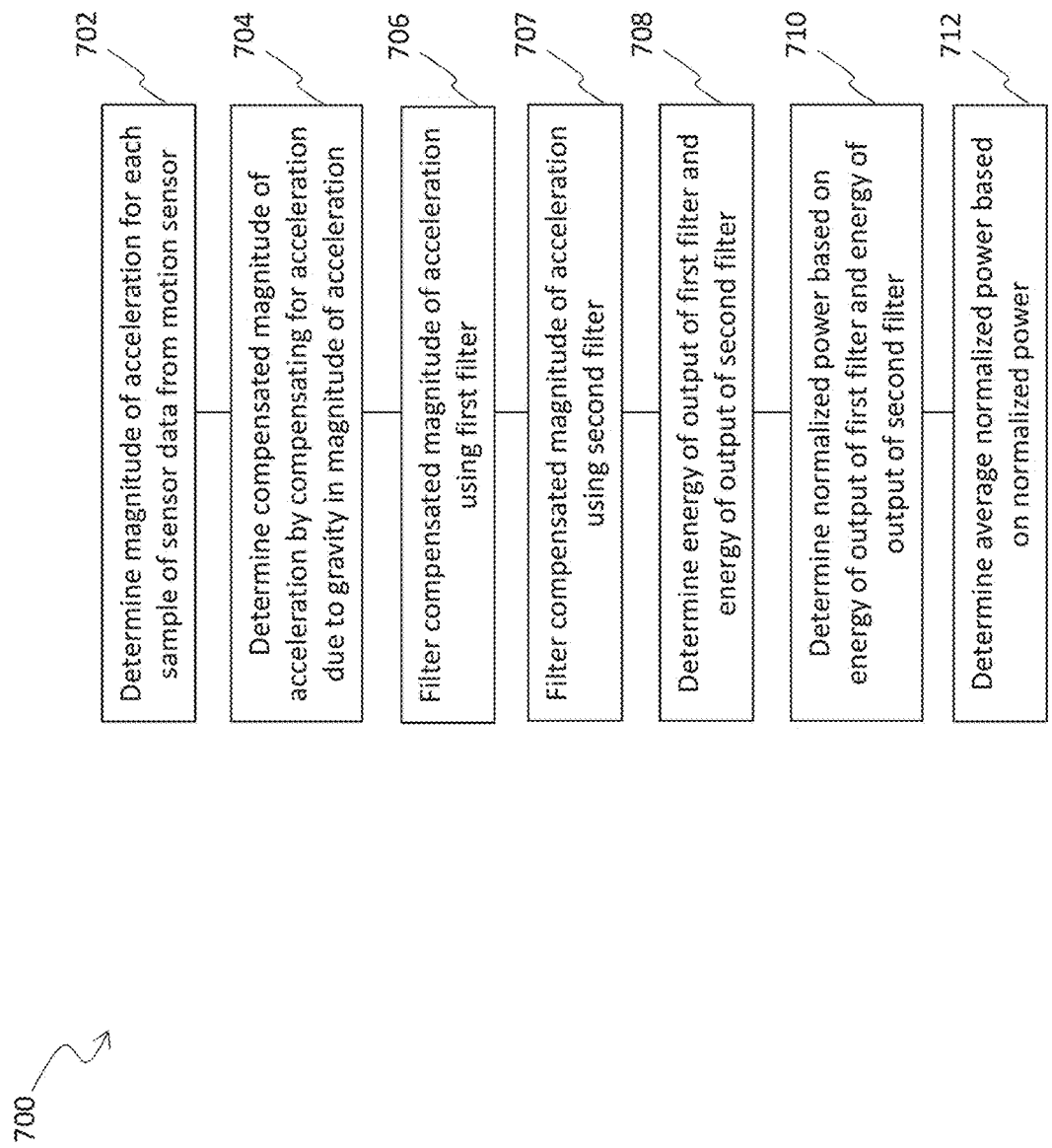
FIG. 7 shows a method of determining an average normalized power of sensor data, in accordance with an embodiment.

FIG. 6 shows a block diagram 600 illustrating the internal circuitry of the third feature detection circuit 104-3, in accordance with an embodiment. Additionally, FIG. 7 shows a method 700 of determining the third metric 106-3, in accordance with an embodiment. The method 700 may be executed by the third feature detection circuit 104-3 shown in FIG. 6. In the example shown in FIGS. 6 and 7, the third metric 106-3 determined by the third feature detection circuit 104-3 may be, or may be indicative of, an average normalized power of the sensor data $102x$, $102y$, $102z$ (e.g. an average of a ratio of the energy in the frequency band FB to the energy outside the frequency band FB). As discussed below, the average normalized power may be determined for a predetermined time window. In some embodiments, the predetermined time window may be about 2 seconds or may include about 100 samples of the sensor data $102x$, $102y$, $102z$.

As shown in FIG. 6, the third feature detection circuit 104-3 may include a magnitude computation circuit 602, which is configured to determine the magnitude (or norm) of acceleration for each sample of the sensor data $102x$, $102y$, $102z$ (e.g. as in step 702 of method 700). Suppose each sample is denoted by the index n, each sample of the lateral axis sensor data $102x$ is denoted by $AccX[n]$, each sample of the longitudinal axis sensor data $102y$ is denoted by $AccY[n]$, and each sample of the normal axis sensor data $102z$ is denoted by $AccZ[n]$. Then, the magnitude of acceleration (denoted as $|Acc[n]|$) for each sample n of the sensor data $102x$, $102y$, $102z$ may be determined by performing the following mathematical operation: $|Acc[n]| = \sqrt{(AccX[n])^2 + (AccY[n])^2 + (AccZ[n])^2}$. As described above, at least a portion of the third feature detection circuit 104-3 may be included in a processor (e.g. of the electronic device 101), and in the example of FIG. 6, the magnitude computation circuit 602 and the mathematical operation described above may be implemented by such a processor.

The third feature detection circuit 104-3 may further include a summer 604, which is configured to compensate for the acceleration due to gravity (e.g. as in step 704 of method 700). This may be accomplished by subtracting 1 from the magnitude of acceleration |Acc[n]| for each sample n of the sensor data 102x, 102y, 102z, as shown in FIG. 6. The output of the summer 604 may be a compensated magnitude of acceleration 605.

The third feature detection circuit 104-3 may include a first filter 606-1 and a second filter 606-2, each of which may be configured to receive, as an input, the compensated magnitude of acceleration 605. The first filter 606-1 and the second filter 606-2 may filter the compensated magnitude of acceleration 605 (e.g. as in steps 706 and 707 of method 700). The first filter 606-1 and the second filter 606-2 may have different passband frequencies. For example, the first filter 606-1 may be a bandpass filter having a passband between about 5 Hz and about 15 Hz. In other words, the passband of the first filter 606-1 may be the frequency band FB in which the characteristic vibrations of the human body occur. The second filter 606-2 may be a high-pass filter having a cutoff frequency of about 15 Hz. In other words, the second filter 606-2 may pass frequencies above or equal to about 15 Hz, while substantially eliminating frequencies below about 15 Hz.

The third feature detection circuit 104-3 may include a first energy computation circuit 608-1 and a second energy computation circuit 608-2. The first energy computation circuit 608-1 may be configured to determine the energy of the output of the first filter 606-1, while the second energy computation circuit 608-2 may be configured to determine the energy of the output of the second filter 606-2 (e.g. as in step 708 of method 700). Consequently, the first energy computation circuit 608-1 may be configured to determine the energy of the sensor data 102x, 102y, 102z in the frequency band FB, and the second energy computation circuit 608-2 may be configured to determine the energy of the sensor data 102x, 102y, 102z outside the frequency band FB.

In some embodiments, the energy of the output of each of the first filter 606-1 and the second filter 606-2 may be determined for a running time window having a predetermined duration (e.g. about 2 seconds or about 100 samples). For example, suppose each sample is denoted by the index n, each sample of the output of the first filter 606-1 is denoted by AccBP[n], and each sample of the output of the second filter 606-2 is denoted by AccHP[n]. Then, the energy of each sample n of the output of the first filter 606-1 (denoted as EN_BP[n]) may be determined by performing the following mathematical operation: EN_BP[n]=$\Sigma_{i=n-99}^{n}$AccBP[i]$^2$. Furthermore, the energy of each sample n of the output of the energy of the output of the second filter 606-2 (denoted as EN_HP[n]) may be determined by performing the following mathematical operation: EN_HP[n]=$\Sigma_{i=n-99}^{n}$AccHP[i]$^2$. As can be seen from these mathematical operations, the energy of the output of each of the first filter 606-1 and 606-2 is determined for a running window of 100 samples (e.g. about 2 seconds based on a sampling frequency of 50 Hz) and overlapping at each sample n. Furthermore, as described above, at least a portion of the third feature detection circuit 104-3 may be included in a processor (e.g. of the electronic device 101), and in the example of FIG. 6, the energy computation circuits 608-1 and 608-2, and the mathematical operations described above, may be implemented by such a processor.

The third feature detection circuit 104-3 may further include a normalized power computation circuit 610, which may be configured to determine a normalized power based on the energy of the output of the first filter 606-1 and the energy of the output of the second filter 606-2 (e.g. as in step 710 of method 700). For example, the normalized power computation circuit 610 may be configured to determine the ratio of the energy of the sensor data 102x, 102y, 102z in the frequency band FB to the energy of the sensor data 102x, 102y, 102z outside the frequency band FB. Suppose each sample is denoted by the index n, then the normalized power of each sample n (denoted as Norm_PWR[n]) may be determined by performing the following mathematical operation: Norm_PWR[n]=EN_BP[n]/EN_HP[n]. As described above, at least a portion of the third feature detection circuit 104-3 may be included in a processor (e.g. of the electronic device 101), and in the example of FIG. 6, the normalized power computation circuit 610, and the mathematical operation described above, may be implemented by such a processor.

The third feature detection circuit 104-3 may further include an averaging circuit 612 configured to determine an average normalized power based on the output of the normalized power computation circuit 610 (e.g. as in step 712 of method 700). Consequently, the averaging circuit 612 may be configured to determine an average of a ratio of the energy in the frequency band FB to the energy outside the frequency band FB. Suppose each sample is denoted by the index n, then the average normalized power (denoted as AV_Norm_PWR [n]) may be determined by performing the following mathematical operation: AV_Norm_PWR[n]=$\frac{1}{100}\Sigma_{i=n-99}^{n}$Norm_PWR[i]. As can be seen from the mathematical operation, the average normalized power is determined for a running window of 100 samples (e.g. about 2 seconds based on a sampling frequency of 50 Hz) and overlapping at each sample n. Furthermore, as described above, at least a portion of the third feature detection circuit 104-3 may be included in a processor (e.g. of the electronic device 101), and in the example of FIG. 6, the averaging circuit 612, and the mathematical operation described above, may be implemented by such a processor. As shown in the example of FIG. 6, the average normalized power AV_Norm_PWR [n] may be output by the third feature detection circuit 104-3 as the third metric 106-3.

Figure 8:
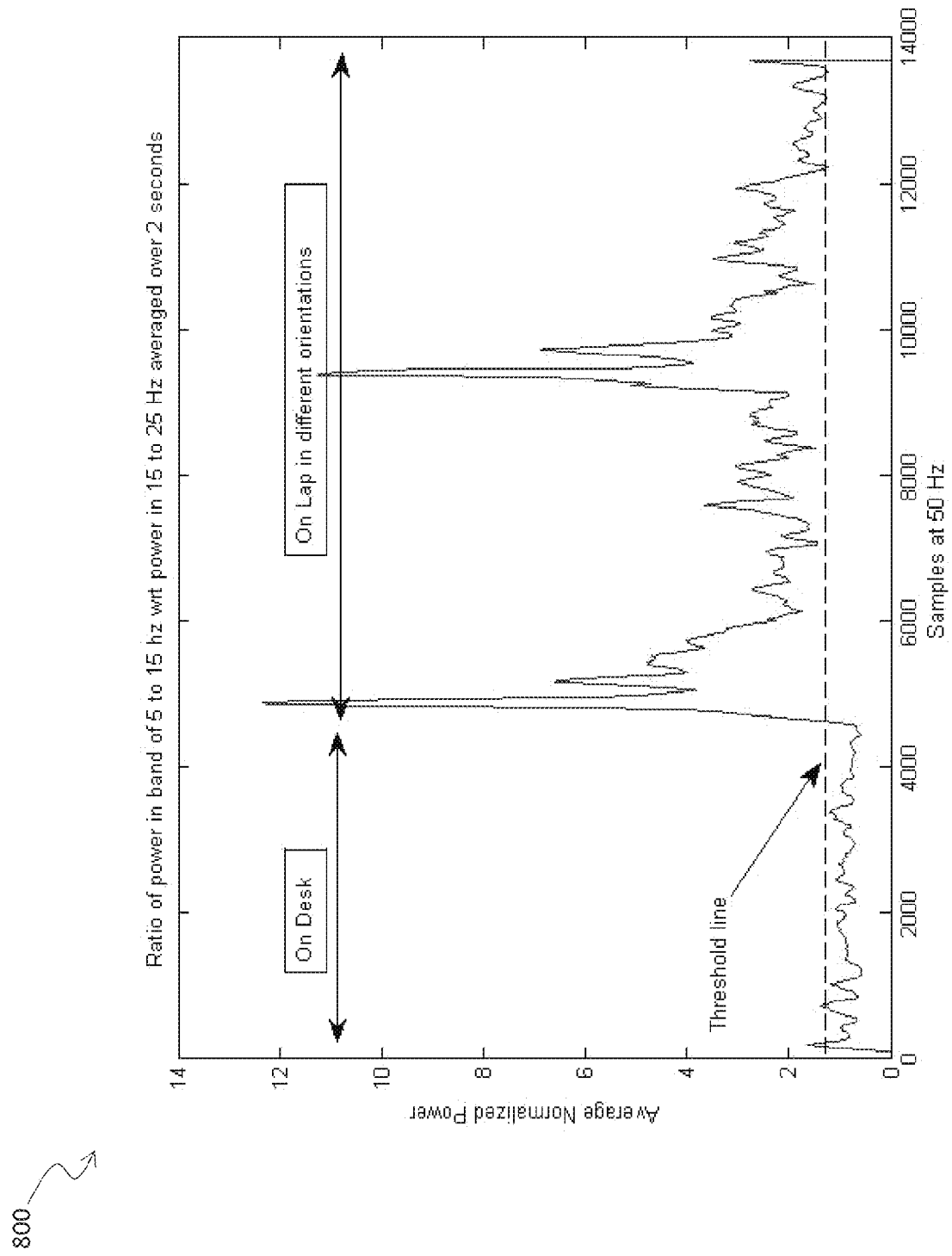
FIG. 8 shows a plot of the average normalized power of the sensor data shown in FIG. 2 using the method shown in FIG. 7, in accordance with an embodiment.

FIG. 8 shows a plot 800 of the average normalized power AV_Norm_PWR [n] of the sensor data 102x, 102y, 102z shown in FIG. 2 using the method 700 of FIG. 7, in accordance with an embodiment. In the plot 800, the horizontal axis denotes the sample index n, while the vertical axis denotes average normalized power in arbitrary units. As shown in FIG. 8, the average normalized power AV_Norm_PWR [n] (which may be an average of a ratio of the energy in the frequency band FB to the energy outside the frequency band FB) in larger when the electronic device 101 is in contact with a human body. This may be attributed to the characteristic vibration of the human body that increases the energy of frequencies in the frequency band FB (relative to frequencies outside the frequency band FB) when the electronic device 101 is in contact with a human body. FIG. 8 also shows that the increase in the average normalized power AV_Norm_PWR [n] is well above a threshold, thereby suggesting that a noise baseline rejection may be used in conjunction with the average normalized power AV_Norm_PWR [n] to determine whether the electronic device 101 is in contact with a human body. In the example shown in FIG. 8, the threshold is set to about 1.8, although other threshold levels may be possible in other embodiments, depending on the noise baseline generated using the method 700 of FIG. 7.

Referring back to FIG. 1, the detection system 100 includes a classifying circuit 108, which may be configured to determine whether the electronic device 101 is in contact with a human body based on at least the third metric 106-3. In other words, in some embodiments, the classifying circuit 108 may use merely the third metric 106-3 (e.g. the average normalized power of the sensor data 102$x$, 102$y$, 102$z$) to determine whether the electronic device 101 is in contact with a human body. In other embodiments, the classifying circuit 108 may use the third metric 106-3 and at least one of the first metric 106-1 (e.g. the total number of zero crossings that occur in the sensor data 102$x$, 102$y$, 102$z$ in a predetermined time window) or the second method 106-2 (e.g. an angle subtended between the electronic device 101 and a reference plane) to determine whether the electronic device 101 is in contact with a human body.

The classifying circuit 108 may generate a decision based, at least in part, on the first metric 106-1 (e.g. where a smaller number of zero crossings may indicate that the electronic device 101 is in contact with the body of a human user). The classifying circuit 108 may generate a decision based, at least in part, on the second metric 106-2 (e.g. where a greater angle subtended between the electronic device 101 and a reference plane, or a greater rate of change thereof, may indicate that the electronic device 101 is in contact with the body of a human user). The classifying circuit 108 may generate a decision based, at least in part, on the third metric 106-3 (e.g. where an average normalized power above a threshold may indicate that the electronic device 101 is in contact with the body of a human user).

The classifying circuit 108 may be a machine learning classifier implemented using machine learning techniques, examples being a decision tree, linear regression, logistic regression, support vector machine (SVM), naive Bayes, k-nearest neighbors, k-means, random forest, gradient boost, among others. To further enhance the accuracy of the determination of whether the electronic device 101 is in contact with a human body, the classifying circuit 108 may implement a time-based voting method. In a time-based voting method, the classifying circuit 108 may output an interim decision every time a new set of metrics 106-1, 106-2, and 106-3 is computed. A history of the interim decisions of the classifying circuit 108 for a given set of metrics 106-1, 106-2, and 106-3 may be maintained (e.g. stored in a memory) and a final decision of the classifying circuit 108 may be based on this history of interim decisions. As an example of the time-based voting method, the metrics 106-1, 106-2, and 106-3 may be computed every 2 seconds. In such an example, there may be a new interim decision from the classifying circuit 108 every 2 seconds, and the interim decisions of the classifying circuit 108 for a 30 second window of time may be stored in history. As such, there may be 15 interim decisions that the classifying circuit 108 may use to render a final decision. Out of these 15 interim decisions, a voting may be performed, and the interim decision with the highest vote may be declared as the final decision of the classifying circuit 108.

An output 110 of the classifying circuit 108 may indicate whether the electronic device 101 is in contact with a human body. For example, the output 110 of the classifying circuit 108 may be expressed as a ternary signal, where ternary 0 indicates an unknown state, where ternary 1 indicates a determination that the electronic device 101 is in contact with a human body, and where ternary 2 indicates a determination that the electronic device 101 is not in contact with a human body. The output no of the classifying circuit 108 may be updated every 5 seconds or less.

The detection system 100 may include a state monitor 112, and the output no of the classifying circuit 108 may be provided to the state monitor 112. The state monitor 112 may be implemented using a controller and a memory register. The output 110 of the classifying circuit 108 may be stored in the memory register of the state monitor 112, and the controller of the state monitor 112 may be configured to read the content of the memory register.

In response to the output 110 of the classifying circuit 108 indicating that the electronic device 101 is in contact with a human body, the state monitor 112 may generate an interrupt signal 114 that may adapt the behavior or operation of electronic device 101 in such a way that high temperatures are circumvented and burning of human skin is avoided. For example, in an embodiment where the electronic device 101 is a laptop computer, the interrupt signal 114 generated by the state monitor may control a cooling fan of the laptop computer to reduce internal temperatures of the laptop computer, thereby avoiding harm to human skin.

Additionally or alternative, the interrupt signal 114 may place the electronic device 101 in a power-down mode in an effort to reduce power consumption and extend battery life. For example, in an embodiment where the electronic device 101 is a pair of Bluetooth headphones, the interrupt signal 114 may place the headphones in a low-power mode in response to the output 110 of the classifying circuit 108 indicating that the headphones are not in contact with a human body. As another example, in an embodiment where the electronic device 101 is a wearable heart rate sensor, the interrupt signal 114 may turn on the sensor in response to the output 110 of the classifying circuit 108 indicating that the sensor is in contact with a human body, or turn off the sensor in response to the output 110 of the classifying circuit 108 indicating that the sensor is not in contact with a human body.

In some embodiments, the state monitor 112 stores a previous output 110 of the classifying circuit 108 (e.g. in the memory register) and compares the previous output 110 to a current output 110 of the classifying circuit 108. Such a comparison may be performed by the controller of the state monitor 112. The state monitor 112 may output the interrupt signal 114 in response to the current output 110 of the classifying circuit 108 being different from the previous output 110 of the classifying circuit 108. Illustratively, this generation of the interrupt signal 114 may be useful in applications where the interrupt signal 114 places the electronic device 101 in a power-down mode (e.g. when not in contact with a human body) or power-up mode (e.g. when in contact with a human body) in an effort to reduce power consumption and extend battery life.

In summary, the human body has a characteristic vibration that can be measured using a motion sensor like an accelerometer. This characteristic vibration ranges from about 5 Hz to about 15 Hz (e.g. denoted as the frequency band FB) and can be observed using the frequency response of a motion signal generated by the motion sensor. This characteristic vibration may be sensed on almost all parts of the human body, including the hand, lap, head, arm, and chest. The characteristic vibration may be analyzed and used to determine whether an electronic device is in contact with a human body. In particular, a metric (e.g. the third metric 106-3) may be used that is indicative of at least one of the following: an energy in the frequency band FB; a ratio of the energy in the frequency band FB to the total energy of the motion signal generated by the motion sensor; a ratio of the energy in the frequency band FB to the energy outside the frequency band FB; an average of the energy in the frequency band FB; an average of a ratio of the energy in the frequency band FB to the total energy of the motion signal generated by the motion sensor; or an average of a ratio of the energy in the frequency band FB to the energy outside the frequency band FB. In response to a determination that the electronic device 101 is in contact with a human body, the behavior or operation of the electronic device 101 may be adapted (e.g. using the interrupt signal 114) to reduce elevated temperatures or to reduce power consumption and extend battery life. Additionally, other metrics (e.g. the first metric 106-1 and the second metric 106-2) may be combined with metric indicative of the characteristic vibration of the human body. For example, metrics indicative of the orientation of the electronic device 101 and/or the amount of activity performed on or using the electronic device 101 may also be used to determine whether the electronic device 101 is in contact with a human body. The detection system 100 shown in FIG. 1 and the solution provided by it may be implemented using limited resources (e.g. one accelerometer) and can be broadly used since each feature (e.g. orientation, activity, and spectral property) may be determined or extracted when the electronic device is in contact with any part of the human body.

A system may include a motion sensor configured to generate a motion signal in response to a movement of an electronic device, and at least one feature detection circuit configured to determine at least one metric based on the motion signal. The system may further include a classifying circuit configured to determine whether the electronic device is in contact with a human body based on the at least one metric.

A system may include an accelerometer configured to generate an output signal in response to a vibration or orientation of an electronic device. The system may further include a plurality of feature detection circuits having inputs coupled to an output of the accelerometer, the plurality of feature detection circuits being configured to determine a plurality of metrics indicative of a plurality of characteristics of the output signal. The system may additionally include a classifying circuit configured to determine whether the electronic device is in contact with a human body based on the plurality of metrics, and a controller configured to adapt an operation of the electronic device based on whether the electronic device is in contact with the human body.

A method may include generating a motion signal in response to a movement of an electronic device; determining at least one characteristic of the motion signal; generating at least one metric indicative of the at least one characteristic of the motion signal; and determining whether the electronic device is in contact with a human body based on the at least one metric.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
a motion sensor configured to generate a motion signal in response to a movement of an electronic device;
a first feature detection circuit configured to output a total number of zero crossings in the motion signal in a predetermined range;
a second feature detection circuit configured to analyze the motion signal in a frequency band indicative of a characteristic vibration of a human body and output a metric of the motion signal indicative of the characteristic vibration of the human body;
a classifying circuit configured to determine whether the electronic device is in contact with the human body based on the total number of zero crossings in the motion signal output from the first feature detection circuit and the metric of the motion signal indicative of the characteristic vibration of the human body output from the second feature detection circuit; and a controller configured to alter operation of the electronic device in order to reduce an internal temperature of the electronic device using a cooling mechanism in response to a determination that the electronic device is in contact with the human body, wherein the controller is configured to place the electronic device in a low-power mode in response to a determination that the electronic device is not in contact with the human body.

2. The system of claim 1, wherein the second feature detection circuit is configured to determine a spectral feature of the motion signal.

3. The system of claim 2, wherein the spectral feature comprises at least one of an energy in the frequency band, a ratio of the energy in the frequency band to a total energy of the motion signal, or a ratio of the energy in the frequency band to an energy outside the frequency band.

4. The system of claim 1, wherein the characteristic vibration of the human body has the frequency band between about 5 Hz and about 15 Hz.

5. The system of claim 1, wherein the motion sensor comprises an accelerometer, and wherein the motion signal comprises an acceleration of the electronic device in each axis of motion.

6. The system of claim 1, further comprising a third feature detection circuit configured to output an orientation of the electronic device based on the motion signal, and wherein the classifying circuit is further configured to determine whether the electronic device is in contact with the human body based on the output from the third feature detection circuit.

7. The system of claim 1, wherein the total number of zero crossings are indicative of an amount of activity performed on the electronic device based on the motion signal.

8. The system of claim 1, wherein the second feature detection circuit comprises:
a magnitude computation circuit configured to determine the magnitude of acceleration for each sample of the motion signal;
a summer to compensate for the acceleration due to gravity;
a bandpass filter coupled to the output of the summer and having a pass band within the frequency band indicative of the characteristic vibration of the human body;
a high-pass filter coupled to the output of the summer and configured to only pass portions of the motion signal at frequencies higher than the frequency band indicative of the characteristic vibration of the human body; and
a power computation and averaging circuit configured to compare outputs from the bandpass filter and the high-pass filter and determine the metric indicative of the characteristic vibration of the human body.

9. The system of claim 1, wherein the second feature detection circuit is configured to compare outputs from a bandpass filter having a passband between about 5 Hz and about 15 Hz and a high-pass filter having a cutoff frequency of about 15 Hz and determine the metric indicative of the characteristic vibration of the human body.

10. A system, comprising:
an accelerometer configured to generate an output signal in response to a vibration or orientation of an electronic device;
a plurality of feature detection circuits having inputs coupled to an output of the accelerometer, the plurality of feature detection circuits being configured to determine a plurality of metrics indicative of a plurality of characteristics of the output signal;
a classifying circuit configured to determine whether the electronic device is in contact with a human body based on the plurality of metrics indicative of the plurality of characteristics of the output signal; and
a controller configured to adapt an operation of the electronic device based on whether the electronic device is in contact with the human body, wherein the controller is configured to cause the electronic device to reduce an internal temperature of the electronic device using a cooling mechanism in response to a determination that the electronic device is in contact with the human body, and wherein the controller is configured to place the electronic device in a low-power mode in response to a determination that the electronic device is not in contact with the human body,
wherein the plurality of characteristics of the output signal comprises a number of zero crossings of the output signal in a predetermined time, wherein the plurality of metrics comprises a zero crossing metric indicative of the number of zero crossings of the output signal in the predetermined time, and wherein the number of zero crossings of the output signal when the electronic device is in contact with the human body is less than the number of zero crossings of the output signal when the electronic device is not in contact with the human body, and
wherein the plurality of characteristics of the output signal comprises a metric indicative of a characteristic vibration of the human body based on analyzing a spectral energy of the output signal within a frequency band indicative of the characteristic vibration of the human body.

11. The system of claim 10, wherein the classifying circuit comprises a machine learning classifier.

12. The system of claim 10, wherein the frequency band is between about 5 Hz and about 15 Hz.

13. The system of claim 10, wherein the plurality of characteristics of the output signal further comprises an angle between a plane of the electronic device and a reference plane, and wherein the plurality of metrics further comprises an orientation metric indicative of the angle between the plane of the electronic device and the reference plane.

14. The system of claim 10, wherein analyzing a spectral energy of the output signal comprises comparing outputs from a bandpass filter having a passband between about 5 Hz and about 15 Hz and a high-pass filter having a cutoff frequency of about 15 Hz.

15. A method, comprising:
generating a motion signal comprising a plurality of sampled motion data in response to a movement of an electronic device;
determining a first characteristic of the motion signal, the first characteristic being determined based on a total number of zero crossings of the motion signal;
determining a second characteristic of the motion signal, the second characteristic being determined based on a spectral energy of the motion signal within a frequency band indicative of a characteristic vibration of a human body;
determining whether the electronic device is in contact with the human body based on the first characteristic that is determined based on a total number of zero crossings of the motion signal and the second characteristic that is determined based on a spectral energy of the motion signal; and altering operation of the electronic device in order to reduce an internal temperature of the electronic device using a cooling fan in response to a determination that the electronic device is in contact with the human body, placing the electronic device in a low-power mode in response to a determination that the electronic device is not in contact with the human body.

16. The method of claim 15, wherein determining the second characteristic of the motion signal comprises determining an average normalized power of the motion signal.

17. The method of claim 16, wherein determining whether the electronic device is in contact with the human body comprises determining that the electronic device is in contact with the human body in response to the average normalized power of the motion signal being greater than a predetermined threshold.

18. The method of claim 16, wherein determining the average normalized power of the motion signal comprises:
 determining a magnitude of acceleration for each sample of the motion signal;
 filtering the magnitude of acceleration using a first filter, the first filter having a pass band within the frequency band indicative of the characteristic vibration of the human body;
 filtering the magnitude of acceleration using a second filter, the second filter only passing portions of the motion signal at frequencies higher than the frequency band indicative of the characteristic vibration of the human body;
 determining an energy of an output of the first filter and an energy of an output of the second filter;
 determining a ratio of the energy of the output of the first filter to the energy of the output of the second filter; and
 determining an average of the ratio of the energy of the output of the first filter to the energy of the output of the second filter.

19. The method of claim 18, wherein the first filter comprises a bandpass filter having a passband between about 5 Hz and about 15 Hz, and wherein the second filter comprises a high-pass filter having a cutoff frequency of about 15 Hz.

20. The method of claim 15, wherein determining the second characteristic of the motion signal comprises comparing outputs from a bandpass filter having a passband between about 5 Hz and about 15 Hz and a high-pass filter having a cutoff frequency of about 15 Hz.

* * * * *